(12) United States Patent
Maton et al.

(10) Patent No.: US 8,022,162 B2
(45) Date of Patent: Sep. 20, 2011

(54) ORGANOSILOXANE COMPOSITIONS

(75) Inventors: Isabelle Maton, Braine l'alleud (BE); Giuseppina Lavinaro, Trivieres (BE); Jean Willieme, Quaregnon (BE); Tommy Detemmerman, Wezembeek-Oppem (BE); Robert Drake, Penarth (GB)

(73) Assignee: Dow Corning Corporation, Midland, MI (US)

( * ) Notice: Subject to any disclaimer, the term of this patent is extended or adjusted under 35 U.S.C. 154(b) by 481 days.

(21) Appl. No.: 11/910,644

(22) PCT Filed: Apr. 3, 2006

(86) PCT No.: PCT/GB2006/050074
§ 371 (c)(1),
(2), (4) Date: May 20, 2008

(87) PCT Pub. No.: WO2006/106361
PCT Pub. Date: Oct. 12, 2006

(65) Prior Publication Data
US 2008/0312365 A1 Dec. 18, 2008

(30) Foreign Application Priority Data

Apr. 6, 2005 (GB) .................................. 0506939.8
Aug. 6, 2005 (GB) .................................. 0516239.1

(51) Int. Cl.
C08G 77/04 (2006.01)
(52) U.S. Cl. ......................................... 528/37; 528/12
(58) Field of Classification Search .................... 528/37, 528/12
See application file for complete search history.

(56) References Cited

U.S. PATENT DOCUMENTS

| 3,220,879 A | 11/1965 | Stare et al. |
| 3,308,203 A | 3/1967 | Metevia et al. |
| 3,341,486 A | 9/1967 | Murphy |
| 3,378,520 A | 4/1968 | Noll et al. |
| 3,419,593 A | 12/1968 | Willing |
| 3,427,270 A | 2/1969 | Northrup |
| 3,433,765 A | 3/1969 | Geipel |
| 3,480,583 A | 11/1969 | Bailey et al. |
| 3,715,334 A | 2/1973 | Karstedt |
| 3,814,730 A | 6/1974 | Karstedt |
| 3,817,894 A | 6/1974 | Butler et al. |
| 3,839,388 A | 10/1974 | Nitzsche et al. |
| 3,923,705 A | 12/1975 | Smith |
| 3,957,842 A | 5/1976 | Prokai et al. |
| 3,962,160 A | 6/1976 | Beers et al. |
| 3,971,751 A | 7/1976 | Isayama et al. |
| 4,020,044 A | 4/1977 | Crossan et al. |
| 4,022,941 A | 5/1977 | Prokai et al. |
| 4,071,498 A | 1/1978 | Frye et al. |
| 4,147,855 A | 4/1979 | Schiller et al. |
| 4,240,450 A | 12/1980 | Grollier et al. |
| 4,247,445 A | 1/1981 | Smith, Jr. et al. |
| 4,312,801 A | 1/1982 | Hiriart Bodin et al. |
| 4,357,438 A | 11/1982 | Sattlegger et al. |
| 4,358,558 A | 11/1982 | Shimizu |
| 4,433,096 A | 2/1984 | Bokerman et al. |
| 4,472,563 A | 9/1984 | Chandra et al. |
| 4,486,567 A | 12/1984 | Bowman et al. |
| 4,515,834 A | 5/1985 | Fukayama et al. |
| 4,564,693 A | 1/1986 | Reiderer |
| 4,568,701 A | 2/1986 | Hopkins, Jr. |
| 4,568,707 A | 2/1986 | Voigt et al. |
| 4,599,438 A | 7/1986 | White et al. |
| 4,614,760 A | 9/1986 | Homan et al. |
| 4,655,767 A | 4/1987 | Woodard et al. |
| 4,701,490 A | 10/1987 | Burkhardt et al. |
| 4,824,891 A | 4/1989 | Laurent et al. |
| 4,902,499 A | 2/1990 | Bolich, Jr. et al. |
| 4,902,575 A | 2/1990 | Yukimoto et al. |
| 4,906,707 A | 3/1990 | Yukimoto et al. |
| 4,918,121 A | 4/1990 | Peccoux et al. |
| 4,965,311 A | 10/1990 | Hirose et al. |
| 4,968,766 A * | 11/1990 | Kendziorski .................... 528/32 |
| 4,985,476 A | 1/1991 | Endres et al. |
| 4,990,555 A | 2/1991 | Trego |
| 5,000,029 A | 3/1991 | Laurent et al. |
| 5,043,012 A | 8/1991 | Shinohara et al. |
| 5,063,270 A | 11/1991 | Yukimoto et al. |
| 5,175,325 A | 12/1992 | Brown et al. |
| 5,210,129 A | 5/1993 | de la Croi Habimana et al. |
| 5,286,787 A | 2/1994 | Podola et al. |
| 5,300,612 A | 4/1994 | Saruyama |
| 5,350,824 A | 9/1994 | Kobayashi |
| 5,534,588 A | 7/1996 | Knepper et al. |

(Continued)

FOREIGN PATENT DOCUMENTS

CN 1346384 A 4/2002

(Continued)

OTHER PUBLICATIONS

English language abstract for DE 3217516 extracted from espacenet.com database dated Jul. 15, 2008.

(Continued)

Primary Examiner — Kuo-Liang Peng
(74) Attorney, Agent, or Firm — Howard & Howard Attorneys PLLC

(57) ABSTRACT

A method of making a diluted organopolysiloxane polymer comprising the steps of:—

(i) preparing an organopolysiloxane polymer by polymerizing cyclic organopolysiloxane monomer(s) in the presence of an organic diluent material, a suitable catalyst and an end-blocking agent; and (ii) Where required quenching the polymerization process; wherein the diluent material is substantially retained within the resulting diluted organopolysiloxane.

19 Claims, No Drawings

U.S. PATENT DOCUMENTS

| | | | |
|---|---|---|---|
| 5,569,750 A | 10/1996 | Knepper et al. | |
| 5,863,976 A | 1/1999 | Schneider | |
| 5,914,382 A | 6/1999 | Friebe et al. | |
| 5,973,060 A | 10/1999 | Ozaki et al. | |
| 5,981,680 A | 11/1999 | Petroff et al. | |
| 6,451,440 B2 * | 9/2002 | Atwood et al. | 428/448 |
| 6,545,104 B1 | 4/2003 | Mueller et al. | |
| 6,599,633 B1 | 7/2003 | Wolf et al. | |
| 6,833,407 B1 | 12/2004 | Ahmed et al. | |
| 7,605,203 B2 | 10/2009 | Feng et al. | |
| 7,754,800 B2 * | 7/2010 | Maton et al. | 524/425 |
| 2003/0105260 A1 | 6/2003 | Cook et al. | |
| 2004/0122199 A1 | 6/2004 | Scheim et al. | |
| 2005/0054765 A1 | 3/2005 | Putzer | |
| 2008/0312365 A1 | 12/2008 | Maton et al. | |
| 2008/0312366 A1 | 12/2008 | Maton et al. | |
| 2008/0312367 A1 | 12/2008 | Maton et al. | |
| 2009/0215944 A1 | 8/2009 | Maton et al. | |
| 2009/0234052 A1 | 9/2009 | Maton et al. | |

FOREIGN PATENT DOCUMENTS

| | | |
|---|---|---|
| DE | 2364856 A1 | 7/1975 |
| DE | 2653499 A1 | 6/1978 |
| DE | 2802170 A1 | 7/1979 |
| DE | 3217516 A1 | 11/1983 |
| DE | 3342027 C1 | 5/1985 |
| DE | 3342026 A1 | 7/1985 |
| EP | 0043501 A1 | 1/1982 |
| EP | 0093918 A1 | 11/1983 |
| EP | 0154922 A2 | 9/1985 |
| EP | 0196565 A1 | 10/1986 |
| EP | 0215470 A2 | 3/1987 |
| EP | 0277740 A2 | 8/1988 |
| EP | 0315333 A2 | 5/1989 |
| EP | 0378420 A2 | 7/1990 |
| EP | 0382365 A2 | 8/1990 |
| EP | 0397036 A2 | 11/1990 |
| EP | 0537785 A1 | 4/1993 |
| EP | 0651022 A2 | 5/1995 |
| EP | 0679674 A2 | 11/1995 |
| EP | 0801101 A1 | 10/1997 |
| EP | 0802233 A2 | 10/1997 |
| EP | 0807667 A2 | 11/1997 |
| EP | 0842974 A1 | 5/1998 |
| EP | 0860459 A2 | 8/1998 |
| EP | 0860461 A2 | 8/1998 |
| EP | 0885921 A2 | 12/1998 |
| EP | 0909778 A1 | 4/1999 |
| EP | 0982346 A1 | 3/2000 |
| EP | 1008598 A2 | 6/2000 |
| EP | 1041119 A2 | 10/2000 |
| EP | 1138715 A1 | 10/2001 |
| EP | 1252252 A2 | 10/2002 |
| EP | 1368426 A2 | 12/2003 |
| EP | 1254192 B1 | 8/2004 |
| EP | 1481038 A2 | 12/2004 |
| GB | 895091 | 5/1962 |
| GB | 918823 | 2/1963 |
| GB | 1289526 | 9/1972 |
| GB | 1490240 | 10/1977 |
| GB | 2012789 A | 8/1979 |
| GB | 2041955 A | 9/1980 |
| GB | 2252975 A | 8/1992 |
| JP | 59100136 A | 6/1984 |
| JP | 59176326 A | 10/1984 |
| JP | 63083167 A | 4/1988 |
| JP | 01152131 | 6/1989 |
| JP | 01152156 | 6/1989 |
| JP | 05178996 | 7/1993 |
| JP | 06016813 | 1/1994 |
| JP | 9506667 | 6/1997 |
| JP | 20000026726 | 1/2000 |
| JP | 2000103857 A | 4/2000 |
| JP | 20003252996 A | 9/2003 |
| WO | WO 9532245 A1 | 11/1995 |
| WO | WO 99/06473 A1 | 2/1999 |
| WO | WO 99/65979 A1 | 12/1999 |
| WO | WO 99/66012 A2 | 12/1999 |
| WO | WO 00/27910 A1 | 5/2000 |
| WO | WO 00/61672 A1 | 10/2000 |
| WO | WO 01/53425 A2 | 7/2001 |
| WO | WO 01/79330 A1 | 10/2001 |
| WO | WO 02/062893 A2 | 8/2002 |
| WO | WO 03/006530 A1 | 1/2003 |
| WO | WO 03/074634 A2 | 9/2003 |
| WO | WO 2005/103117 A1 | 11/2005 |

OTHER PUBLICATIONS

English language abstract for DE 3342026 extracted from espacenet.com database dated Jul. 15, 2008.

English language abstract for DE 3342027 extracted from espacenet.com database dated Jul. 15, 2008.

English language abstract for EP 0043501 extracted from delphion.com database dated Jul. 22, 2008.

English language abstract for EP 0093918 extracted from espacenet.com database dated Jul. 18, 2008.

English language abstract for EP 0215470 extracted from delphion.com database dated Jul. 22, 2008.

English language abstract for EP 0801101 extracted from espacenet.com database dated Jul. 15, 2008.

English language abstract for EP 0807667 extracted from espacenet.com database dated Jul. 15, 2008.

English language abstract for EP 0885921 extracted from espacenet.com database dated Jul. 18, 2008.

PCT International Search Report for PCT/GB2006/050075, Jul. 28, 2006, 4 pages.

PCT International Search Report for PCT/GB2006/050072, Jul. 21, 2006, 4 pages.

PCT International Search Report for PCT/GB2006/050073, Aug. 2, 2006, 5 pages.

PCT International Search Report for PCT/EP2006/061285, Jul. 28, 2006, 4 pages.

PCT International Search Report for PCT/US2006/011986, Aug. 2, 2006, 3 pages.

English language abstract not available for DE2364856. However, see English language equivalent GB1490240, Jul. 1975.

English language abstract not available for DE2653499. However, see English language equivalent US4147855, Jun. 1978.

English language abstract not available for DE2802170. However, see English language equivalent GB2012789, Jul. 1979.

English language abstract not available for EP0154922. However, see English language equivalent US4568707, Sep. 1985.

English language abstract not available for EP1252252. However, see English language equivalent WO0153425, Oct. 2002.

English language abstract not available for EP1368426. However, see English language equivalent WO02062893, Dec. 2003.

English language abstract not available for EP1481038. However, see English language equivalent WO03074634, Dec. 2004.

English language abstract for JP01152131 extracted from the PAJ database Jun. 13, 2011, 7 pages.

English language abstract for JP01152156 extracted from the PAJ database Jun. 13, 2011, 2 pages.

English language translation and abstract for JP05178996 extracted from the PAJ database Jun. 13, 2011, 17 pages.

English language translation and abstract for JP06016813 extracted from the PAJ database Jun. 23, 2011, 23 pages.

English language translation and abstract for JP2000026726 extracted from the PAJ database Jun. 13, 2011, 28 pages.

English language translation and abstract for JP2000103857 extracted from the PAJ database Jun. 13, 2011, 23 pages.

English language translation and abstract for JP2003252996 extracted from the PAJ database Jun. 13, 2011, 14 pages.

English language translation and abstract for JP5178996 extracted from the PAJ database Jun. 13, 2011, 17 pages.

English language abstract not available for JP59100136, Jun. 1984.

English language abstract not available for JP59176326. However, see English language equivalent US4433096, Oct. 1984.

English language abstract for JP63083167 extracted from espacenet.com database Jun. 23, 2011, 12 pages.

English language abstract not available for JP9506667. However, see English language equivalent US5569750, Jun. 1997.

International Search Report for Application No. PCT/GB2006/050074 dated Jul. 24, 2006, 3 pages.

English language abstract for CN 1346384 extracted from espacenet.com database, dated Jul. 16, 2010, 22 pages.

Article: Kirk-Othmer, "Silicone Compounds", Encycolpedia of Chemical Technology, 4th edition, vol. #22, 1997, pp. 107-109.

Dictionary of Chemistry and Chemical Technology, 2 pages (title page and p. 1250); Author: Hua xue hua gong da ci dian bian wei hui.; Hua xue gong ye chu ban she. Ci shu bian ji bu Publisher: Hua xue gong ye chu ban she, 2003 ISBN: 7502526110 9787502526115.

Mark E. Van Dyke, et al., Reaction Kinetics for the Anionic Ring-Opening Polymerization of Tetraphenyletramethylcyclo-Tetrasiloxane Using a Fast Catalyst System, 2 pages.

Aart Molenberg, et al., A Fast Catalyst System for the Ring-Opening Polymerization of Cyclosiloxanes, Macromol, Rapid Commun. 16, 449-453 (1995), 5 pages.

Reinhard Schwesinger, Extremely Strong, Uncharged Auxiliary Bases; Monomeric and Polymer-Supported Polyaminophosphazenes (P2-P5), 1996, 27 pages.

A.W. Karlin, et al., Uber Syntheseverfahren von Siloxanelastomeren, 5 pages.

* cited by examiner

ORGANOSILOXANE COMPOSITIONS

RELATED APPLICATIONS

This application claims priority to and all the advantages of International Patent Application No. PCT/GB2006/050074, filed on Apr. 3, 2006, which claims priority to Great Britain Patent Application Nos. GB 0506939.8 and GB 0516239.1, filed on Apr. 6, 2005 and Aug. 6, 2005, respectively.

This invention is concerned with the ring-opening polymerisation of organosiloxane polymers in the presence of a diluent and compositions containing the resulting polymers.

The cyclic siloxanes which are formed in the hydrolysis of the corresponding diorganodichlorosilanes and which can be isolated in a simple manner by distillation, are critical intermediates in the silicone industry as they may be used as the main building blocks in the preparation of high molecular weight linear polydiorganosiloxanes. The cyclosiloxanes preferred for use as polymer building blocks typically have an average of from 3 to 10 silicon atoms in the cyclosiloxane ring, examples include hexaorganocyclotrisiloxanes and octaorganocyclotetrasiloxanes. Typically the cyclosiloxanes and mixtures thereof either alone or together with suitably end-blocked linear polydiorganosiloxanes, undergo a polymerisation process involving the ring opening of the cyclosiloxanes by reaction in the presence of a catalyst such as an acid or base. An equilibrium between the desired high-molecular compounds and a mixture of cyclic compounds is set up in the course of the polymerisation reaction. The resulting equilibrium largely depends on the nature and amount of siloxane(s), the catalyst used and on the reaction temperature. Such polymerisation processes are generally carried out in the absence of a solvent, but in the past have been prepared in solvents (e.g. polar and non-polar organic solvents) or in emulsion. However, the use of solvents and or emulsions are not recommended due to the need for complex processes for their removal after the reaction is complete. Typically end-blocking agents are used to add functionality and regulate the molecular weight of the polymer.

Various catalysts are known for the polymerisation of cyclosiloxanes. Examples include alkali metal hydroxides such as potassium or caesium hydroxide, alkali metal alkoxides or complexes of alkali metal hydroxides and an alcohol, alkali metal silanolates such as potassium silanolate or trimethylpotassium silanolate, phosphonitrile halides (sometimes referred to as acidic phosphazenes) phosphazene bases and the catalyst derived by the reaction of a tetra-alkyl ammonium hydroxide and a siloxane tetramer as described in U.S. Pat. No. 3,433,765. After the reaction has ended, the catalyst is neutralised in a suitable manner and the low-molecular constituents may be stripped off if desired.

Phosphazene bases are known to be extremely strong bases. Numerous phosphazene bases and routes for their synthesis have been described in the literature, for example in Schwesinger et al, Liebigs Ann. 1996, 1055-1081. The use of a phosphazene base catalyst for the ring-opening polymerisation of a cyclosiloxane on a laboratory scale has been described in Molenberg and Möller, Macromol Rapid Commun. 16, 449-453 (1995). Octamethylcyclotetrasiloxane (sometimes referred to as "D4", where D denotes an —Si (CH$_3$)$_2$O— unit) was polymerised in toluene solution in the presence of methanol and a phosphazene base used was a 1 molar solution in hexane. The methanol was deprotonated by the phosphazene base to form methoxide ions which initiate the reaction. A similar reaction system has been used by Van Dyke and Clarson in Poly Prep ACS Div Polym Chem 1996, 37, 668 to prepare tetraphenyltetramethyl-cyclotetrasiloxane, the phenylmethyl analogy of D4. A W. Karlin and S. N. Borissow (Plaste und Kautschuk 13 (1966) 3, page 161/165) describe the preparation of high-molecular polydiorganosiloxanes with the aid of acid and basic catalysts (based on aluminium sulphate or alkali metal silanolates), in which they give preference to acid polymerisation. This can be carried out at a low temperature (100° C.) and a longer period of time (6 to 8 hours) is required for the equilibrium to be set up, so that control of the process is facilitated. EP0860459 describes a process for making silicone-filler mixtures which comprises effecting the ring-opening polymerisation of a cyclosiloxane with a phosphazene base in the presence of a filler and water.

Polymerisation may be terminated by using a neutralizing agent which reacts with the catalyst to render it non-active. In most cases catalyst residues are preferably removed from the resulting polymer product by an appropriate separation method, e.g. filtration.

The rheological properties of uncured polymers are primarily a function of their viscosities. In general the lower the viscosity of a polymer the higher the extrusion rate of uncured compositions which contain the polymer. The viscosity of an uncured polymer is directly related to the molecular weight of the polymer and the length of the polymer chain, usually defined as the degree of polymerisation (dp). The viscosity of the uncured polymer is also a major influence on several of the physical properties of compositions incorporating the polymer such as, for example, sealant compositions, when such compositions are subsequently cured.

Organosiloxane compositions which cure to elastomeric solids are well known and such compositions can be produced to cure at either room temperature in the presence of moisture or with application of heat. Typically those compositions which cure at room temperature in the presence of moisture are obtained by mixing a polydiorganosiloxane based polymer having reactive terminal groups, with a suitable silane (or siloxane) based cross-linking agent in the presence of one or more fillers and a curing catalyst. These compositions are typically either prepared in the form of one-part compositions curable upon exposure to atmospheric moisture at room temperature or two part compositions curable upon mixing under room conditions.

One important application of the above-described curable compositions is their use as sealants. In use as a sealant, it is important that the composition has a blend of properties which render it capable of being applied as a paste to a joint between substrate surfaces where it can be worked, prior to curing, to provide a smooth surfaced mass which will remain in its allotted position until it has cured in to an elastomeric body adherent to the adjacent substrate surfaces. Typically sealant compositions are designed to cure quickly enough to provide a sound seal within several hours but at a speed enabling the applied material to be tooled in to a desired configuration shortly after application. The resulting cured sealant is generally formulated to have a strength and elasticity appropriate for the particular joint concerned.

The physical properties of the resulting cured composition effected include elongation and modulus (at 100% elongation) which are particularly important for sealants used in for example expansion joints in the construction and transportation industries, where the need for sealants with low modulus and high elongation are essential.

Hence, whilst it is known that increasing the molecular weight of a polymer would improve some physical properties of a sealant typically the maximum viscosity used in current formulations are in practice no greater than about 150 000 mPa·s at 25° C. Whilst organopolysiloxanes polymers having viscosities of up to 1,000,000 mPa·s at 25° C. have been discussed in the prior art the use of polymers having such viscosities has been practically and economically unmanageable. Hence, whilst it is known that increasing the molecular weight of the organopolysiloxane polymer would improve the some properties of the sealant typically the maximum viscosity used in current formulations are in practice no greater than about 150 000 mPa·s at 25° C.

It has become common practice in the formulation of silicone based compositions used as room temperature cure sealants, to include additives which serve to "extend" and/or "plasticise" the silicone sealant composition by blending the or each extending compound (henceforth referred to as an "extender") and/or plasticising compound (henceforth referred to as a "plasticiser") with the pre-prepared polymer and other ingredients of the composition.

An extender (sometimes also referred to as a process aid or secondary plasticiser) is used to dilute the sealant composition and basically make the sealant more economically competitive without substantially negatively affecting the properties of the sealant formulation. The introduction of one or more extenders into a silicone sealant composition not only reduces the overall cost of the product but can also affect the properties of resulting uncured and/or cured silicone sealants. The addition of extenders can, to a degree, positively effect the rheology, adhesion and clarity properties of a silicone sealant and can cause an increase in elongation at break and a reduction in hardness of the cured product both of which can significantly enhance the lifetime of the cured sealant provided the extender is not lost from the cured sealant by, for example, evaporation or exudation.

A plasticiser (otherwise referred to as a primary plasticiser) is added to a polymer composition to provide properties within the final polymer based product to increase the flexibility and toughness of the final polymer composition. This is generally achieved by reduction of the glass transition temperature ($T_g$) of the cured polymer composition thereby generally, in the case of sealants for example, enhancing the elasticity of the sealant which in turn enables movement capabilities in a joint formed by a silicone sealant with a significant decrease in the likelihood of fracture of the bond formed between sealant and substrate when a sealant is applied thereto and cured. Plasticisers are typically used to also reduce the modulus of the sealant formulation. Plasticisers may reduce the overall unit cost of a sealant but that is not their main intended use and indeed some plasticisers are expensive and could increase the unit cost of a sealant formulation in which they are used. Plasticisers tend to be generally less volatile than extenders and are typically introduced into the polymer composition in the form of liquids or low melting point solids (which become miscible liquids during processing. Typically, for silicone based composition plasticisers are unreactive short chain siloxanes such as polydimethylsiloxane having terminal triorganosiloxy groups wherein the organic substituents are, for example, methyl, vinyl or phenyl or combinations of these groups. Such polydimethylsiloxanes normally have a viscosity of from about 5 to about 100,000 mPa·s. Compatible organic plasticisers may additionally be used, examples include dialkyl phthalates wherein the alkyl group may be linear and/or branched and contains from six to 20 carbon atoms such as dioctyl, dihexyl, dinonyl, didecyl, diallanyl and other phthalates; adipate, azelate, oleate and sebacate esters, polyols such as ethylene glycol and its derivatives, organic phosphates such as tricresyl phosphate and/or triphenyl phosphates, castor oil, tung oil, fatty acids and/or esters of fatty acids.

Extenders need to be both sufficiently compatible with the remainder of the composition and as non-volatile as possible at the temperature at which the resulting cured sealant is to be maintained (e.g. room temperature). However it has been found that whilst some proposed extenders are effective during storage, at the time of application of the sealant and at least for a time thereafter, there are several well known problems regarding their use. These include:—
  (i) UV stability—the discolouring of cured sealants containing extenders upon prolonged exposure to UV light;
  (ii) Poor compatibility with the polymer composition (e.g. a sealant composition) leading to their exuding from the sealant over time which negatively effects the physical and aesthetic properties and lifetime of the cured product e.g. sealant; and
  (iii) Staining of the surrounding substrates onto which the extenders exude from the composition.

The process used in the industry, for introducing extenders and/or plasticisers into a polymer composition such as a sealant composition, consists of merely mixing all the pre-prepared ingredients, e.g. polymer, cross-linker, catalyst, filler and the or each extender and/or plasticiser together in appropriate amounts and orders of addition. Compatibility of organic extenders and/or plasticisers with the other ingredients in a silicone based polymer composition, is a significantly greater problem than with respect to organic based polymers, silicone polymers into which the extenders and/or plasticisers are introduced tend to be highly viscous polymers, and the chemical nature of the polymer being silicone based as opposed to organic based can have significant effects on the compatibility. The level of compatibility effectively determines the amount of extender and/or plasticiser which can be introduced into a polymer composition. Typically this results in the introduction of significantly lower amounts of, in particular, extenders into the composition than may be desired because the extender will not physically mix into the polymer composition sufficiently well, particularly with the pre-formed polymer which is usually the largest component, other than the filler, in the composition. The problem of compatibility of plasticisers and extenders in silicone polymer compositions has been known in the industry ever since the introduction of organic extenders, which as far the inventors are aware, until the present invention has not been addressed other than by the proposal of an ever increasing number of organic based extenders.

DE3342026 describes a process involving the physical blending of a portion of pre-formed organosilicone polymer together with some or all of the plasticiser. The physical blending of polymer and plasticiser is exemplified in the examples using an alpha omega dihydroxypolydimethylsiloxane having a viscosity of merely about 80 000 mPa·s at 20° C. thereby avoiding the problems which the present inventors have addressed and which would be encountered using such a physical blending process for high viscosity polymers wherein such a blending process would involve very expensive mixing equipment for long time periods of time to obtain anything like a suitable blend rendering such a process economically unviable and most likely not provide a suitable blend.

Historically, unreactive siloxanes such as trialkylsilyl terminated polydiorganosiloxanes (for example trimethylsilyl terminated polydimethyl siloxane (PDMS)) were originally used as extenders and/or plasticisers in silicone based sealants because they were chemically similar and had excellent compatibility.

A wide variety of organic compounds and compositions have been proposed for use as extenders for reducing the cost of the silicone sealant compositions. These materials are generally classified into two groups as high volatility extenders and low volatility extenders.

Compositions containing high volatility extenders may contain e.g. toluene or xylene. The high volatility of these compounds causes a number of disadvantages in sealant formulations including, high shrinkage (high volume loss due to evaporation of the solvent), flammability, VOC (volatile organic content), hazardous component labelling, health and safety issues, etc.

Low volatility extenders (sometimes referred to as higher molecular weight extenders), are chosen with the intention of having good compatibility with the polymers in the sealant compositions. The resulting sealants are termed "extended sealants" and generally show much more acceptable properties than diluted sealants. These higher molecular weight extenders can completely or partially replace the PDMS plasticizer in the formulation.

Low molecular weight polyisobutylenes (PIB) are proposed as extenders in DE 2364856 and DE 3217516, however, due to the limited compatibility, the maximum amount of PIB extender that can be added to an acetoxy silicone sealant formulation is typically in the 25-30% (by weight) range. A higher addition level causes the extender to bleed to the surface and makes the cured sealant surface sticky. Phosphate esters are described as potential extenders in DE 2802170 and DE 2653499.

Mineral oil fractions (e.g. isoparaffins) and polyalkylbenzenes such as heavy alkylates (alkylated aromatic materials remaining after distillation of oil in a refinery) have also been proposed as extenders. These and other organic compounds and mixtures proposed as extender materials for silicone sealant compositions are described in the following publications:—
GB2041955 describes the use of dodecyl benzene and other alkylarenes as organic extenders. GB2012789 describes the use of trioctyl phosphate for the partial replacement of PDMS. DE3342026 and DE3342027 describe the use of esters of aliphatic monocarboxylic acids as extenders. EP0043501 proposes the use of between 0.2 and 15% by weight of the sealant composition of branched and/or cyclic paraffin hydrocarbons such as cyclohexane, isohexane and isooctodecane. EP0801101 describes the use of a mixture of paraffin oils (molecular weight>180) in combination with one or more alkyl aromatic compounds. EP0842974 describes the use of alkylcyclohexanes (molecular weight>220). WO99/66012 and WO 00/27910 describe oil resistant silicone compositions containing one or more aliphatic liquid polymers and oils, petroleum derived organic oils, alkyl phosphates, polyalkylene glycol, poly (propylene oxides), hydroxyethylated alkyl phenol, dialkyldithiophosphonate, poly (isobutylenes), poly (a-olefins) and mixtures thereof as extenders.

In recent years the industry has increasingly used paraffinic hydrocarbons as extenders. EP0885921 describes the use of paraffinic hydrocarbon mixtures containing 60 to 80% paraffinic and 20 to 40% naphthenic and a maximum of 1% aromatic carbon atoms. EP0807667 appears to describe a similar extender comprising wholly or partially of a paraffin oil comprising 36-40% cyclic paraffin oils and 58 to 64% non-cyclic paraffin oils. WO99/65979 describes an oil resistant sealant composition comprising a plasticiser which may include paraffinic or naphthenic oils and mixtures thereof amongst other plasticisers. EP1481038 describes the use of a hydrocarbon fluid containing more than 60 wt. % naphthenics, at least 20 wt. % polycyclic naphthenics and an ASTM D-86 boiling point of from 235 to 400° C. EP1252252 describes the use of an extender comprising a hydrocarbon fluid having greater than 40 parts by weight cyclic paraffinic hydrocarbons and less than 60 parts by weight monocyclic paraffinic hydrocarbons based on 100 parts by weight of hydrocarbons. EP1368426 describes a sealant composition for use with alkyd paints containing a liquid paraffinic hydrocarbon "extender" which preferably contains greater than 40% by weight of cyclic paraffins.

Whilst many of the organic extenders proposed above have potential they all generally have problems for example whilst alkylbenzene extenders have a seemingly suitable combination of properties, i.e. high boiling points, excellent compatibility with the polydiorganosiloxane polymer matrix (resulting in cured silicone sealants of good to excellent transparency), low environmental impact, low vapour pressure (and therefore low shrinkage), positive effect on the rheological properties (reduced stringing). However, when exposed to artificial or natural weathering, alkyl benzene extended sealants tend to yellow rather rapidly. Over prolonged weathering, these extended sealants continue to yellow, and also lose their transparency. This problem does not occur with other extenders, such as phosphate esters or polyisobutylene.

Furthermore, whilst the use of polymers with very high degrees of polymerisation in siloxane formulations, can result in several advantageous properties such as high elasticity the viscosity of such polymers is generally so great (i.e. silicone gums) that they become either completely unmanageable with respect to inter-mixing with other ingredients, such as fillers, cross-linkers, extenders and/or plasticisers, or require very high shear mixers which are expensive to operate. There has therefore been a long-felt need within the industry to develop a process for the ease of introduction of silicone based polymers of very high degrees of polymerisation into compositions whilst avoiding the need for high cost equipment.

The inventors have now surprisingly developed a new process for the preparation of silicone gums involving the incorporation of organic based diluents comprising extenders and/or plasticisers in organopolysiloxane formulations permitting, for example, the preparation of polymers of significantly greater chain length and viscosity (when in the absence of the extenders and/or plasticiser) whilst avoiding compounding problems usually encountered with polymers of such viscosities. Such diluted polymers resulting from the above may provide products comprising such polymers with new and advantageous properties in comparison with prior art materials.

In accordance with the present invention there is provided a method of making a diluted organopolysiloxane polymer comprising the steps of:—
   i) Preparing an organopolysiloxane polymer by polymerising cyclic organopolysiloxane monomer(s) in the presence of an organic based diluent material, a suitable catalyst and an end-blocking agent; and
   ii) Where required quenching the polymerisation process; wherein the diluent material is substantially retained within the resulting diluted organopolysiloxane.

In accordance with the present invention there is provided a diluted organopolysiloxane polymer obtainable by a method comprising the steps of:—
   (i) polymerising cyclic organopolysiloxane monomer(s) in the presence of an organic diluent, a suitable catalyst and an end-blocking agent; and
   (ii) Where required quenching the polymerisation process; wherein the diluent material is substantially retained within the resulting diluted organopolysiloxane.

The concept of "comprising" where used herein is used in its widest sense to mean and to encompass the notions of "include" and "consist of". Unless otherwise indicated all viscosity values given are at a temperature of 25° C.

Preferably the diluents are miscible or at least substantially miscible with the monomer/oligomer starting materials, and more particularly with both intermediate polymerisation reaction products and the final polymerisation product with which they are initially mixed. Diluents which are "substantially miscible" are intended to include diluents which are completely or largely miscible with the monomer and/or oligomer and/or the reaction mixture during polymerisation and hence may include low melting point solids which become miscible liquids in a reaction mixture during the polymerisation process.

The inventors have found that any known suitable cyclic organopolysiloxane monomer/oligomer may be utilised in the polymerisation process in accordance with the present invention. Cyclic siloxanes which are useful are well known and commercially available materials. They have the general formula $(R_2SiO)_m$, wherein each R may be the same or different and denotes hydrogen or a hydrocarbon group having from 1 to 18 carbon atoms, a substituted hydrocarbon group having from 1 to 18 carbon atoms or a hydrocarbonoxy group having up to 18 carbon atoms. Preferably R is an optionally substituted alkyl, alkenyl, aryl, alkaryl or aralkyl group having up to 8 carbon atoms, m denotes an integer with a value of from 3 to 12. R may contain substituted groups, e.g. by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, and butenyl. The aryl and aralkyl groups can be, for example, phenyl, tolyl, and benzoyl. The preferred groups are methyl, ethyl, phenyl, vinyl, and trifluoropropyl. Preferably at least 80% of all R groups are methyl or phenyl groups, most preferably methyl. Preferably the average value of m is from 3 to 6. Examples of suitable cyclic siloxanes are octamethylcyclotetrasiloxane, hexamethylcyclotrisiloxane, decamethylcyclopentasiloxane, cyclopenta(methylvinyl)siloxane, cyclotetra(phenylmethyl) siloxane, cyclopentamethylhydrosiloxane and mixtures thereof. One particularly suitable commercially available material is a mixture of comprising octamethylcyclotetrasiloxane and decamethylcyclopentasiloxane.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as aminofunctional groups, amido-functional groups, and cyano-functional groups; sulphur atoms; and sulphur atom containing groups such as mercapto groups.

The starting material for equilibration polymerisation can be solely cyclic siloxanes as described above but may optionally comprise mixtures of cyclosiloxanes together with polydiorganosiloxane material having units of the general formula $R_aSiO_{4-a/2}$ wherein each R may be the same or different and is as hereinbefore described. Subscript a is zero or an integer between 1 and 4 inclusive but preferably has an average value of from 1 to 3, preferably 1.8 to 2.2 per molecule. Preferably the polydiorganosiloxanes are polydialkylsiloxanes, and most preferably polydimethylsiloxanes. They are preferably substantially linear materials, which are end-blocked with a siloxane group of the formula $R''_3SiO_{1/2}$, wherein R" is R or hydroxyl. In some instances a small proportion of the starting material may comprise a linear polydimethylsiloxane with one terminal group having a formula where each R" is the same and is an alkyl group and a second terminal group at least one R" group is a hydroxy group. Preferably such a polymer has a viscosity of from 1000 to 100000 mPa·s.

As previously indicated in the presence of suitable catalysts such monomers will participate in polymerisation processes involving the ring opening of the cyclosiloxanes and an equilibrium stage.

Thus the process according to the invention is useful for making organopolysiloxanes having units of the general formula $R_aSiO_{4-a/2}$ wherein R and a are as described above. Preferably at least 80% of all R groups are alkyl or aryl groups, more preferably methyl groups. Most preferably substantially all R groups are alkyl or aryl groups, especially methyl groups. The organopolysiloxanes are preferably those in which the value of a is 2 for practically all units, except for the terminal groups units, and the siloxanes are substantially linear polymers of the general formula $R''(R_2SiO)_pSiR_2R''$ wherein R and R" are as defined above and p is an integer. It is, however, also possible that small amounts of units wherein the value of a denotes 0 or 1 are present. Polymers with such units in the chain would have a small amount of branching present. The viscosity of the organopolysiloxanes which may be produced by the process using a catalyst according to the present invention may be in the range of from 1000 to many millions mPa·s at 25° C., depending on the reaction conditions and raw materials used in the method of the invention.

The process according to the invention can be used to make a whole range of siloxane polymers, including liquid siloxane polymers and gums of high molecular weight, for example from $1\times10^4$ to $100\times10^9$ mPa·s. The catalyst used in the present invention has sufficient activity to enable the formation of polymers in a reasonable time at a low catalyst concentration.

Molecular weight changes during polymerisation can be monitored by sampling the reaction during polymerisation, and analysing each sample by gel permeation chromatography to determine the molecular weight (ASTM D 5296-05). Polymers of very high molecular weights can be obtained because of the very low catalyst concentrations needed for the polymerisation, with the result that the molecular weight of the polymer produced is dependent on the end group concentration as potentially there will be a very low concentration of end groups (especially in the absence of added end-blockers). However, we have found that at very low catalyst concentrations, such as 2 ppm, the molecular weight obtained increases with reaction time. The process may be limited by diffusion of the catalyst, which is very slow in these high molecular weight polymers.

Preferably the polymer produced in accordance with the present invention has an average number molecular weight (Mn) greater than 132,000 and a degree of polymerisation of greater than 1800 as determined by D5296-05 with the values being determined in terms of polystyrene molecular weight equivalents.

Any suitable catalyst may be utilised. These include alkali metal hydroxides such as lithium hydroxide, sodium hydroxide, potassium hydroxide or caesium hydroxide, alkali metal alkoxides or complexes of alkali metal hydroxides and an alcohol, alkali metal silanolates such as potassium silanolate caesium silanolate, sodium silanolate and lithium silanolate or trimethylpotassium silanolate. Other catalysts which might be utilised include the catalyst derived by the reaction of a tetra-alkyl ammonium hydroxide and a siloxane tetramer. These various catalyzing agents have different relative reactivities with respect to the present polymerization process, and accordingly, compensation must be made for them. For example, sodium hydroxide will catalyze the reaction more slowly than the others, and therefore the reaction takes longer at any given temperature. On the other hand, caesium hydroxide causes reaction to take place more rapidly. Thus caesium hydroxide may be more effective when a lower reaction temperature is employed or when it is desired to produce a silicone gum having a very high viscosity. Of the above potassium silanolate is particularly preferred as it is an active form of potassium hydroxide and which is also very soluble in a monomer solution such as octamethylcyclotetrasiloxane. The catalyst concentration can be from about 5 ppm to about 500 ppm of Equivalent KOH. The KOH equivalence of potassium silanolate ranges from approximately 0.05% to 6.0% KOH by weight. In the preferred embodiment of the process of the present invention potassium silanolate is employed at a KOH concentration of about 20 ppm by weight.

Catalysts which are most preferred for this type of reaction however are phosphonitrile halides (sometimes referred to as acidic phosphazenes) and phosphazene bases such as those described in EP 0860461 and EP 1008598 the content of which are included herein by reference.

Preferred phosphonitrile chloride, catalysts include those prepared according to U.S. Pat. Nos. 3,839,388 and 4,564,693 or EP application 215 470 and phosphonitrile halide ion based catalysts, as described in GB2252975, having the general formula $[X^2(PX^2_2=N)_sPX^2_3]^+[M^2X^2_{(v-t+1)}R^{III}_t]^-$, wherein $X^2$ denotes a halogen atom, $M^2$ is an element having an electronegativity of from 1.0 to 2.0 according to Pauling's scale, $R^{III}$ is an alkyl group having up to 12 carbon atoms, s has a value of from 1 to 6, v is the valence or oxidation state of $M^2$ and t has a value of from 0 to v−1.

Alternatively the catalyst may comprise an oxygen-containing chlorophosphazene containing organosilicon radicals having the following general formula:—

$$Z^1-PCl_2=N(-PCl_2=N)_n-PCl_2-O$$

in which
$Z^1$ represents an organosilicon radical bonded to phosphorus via oxygen, a chlorine atom or the hydroxyl group and
n represents 0 or an integer from 1 to 8. The catalyst may also comprise condensation products of the above and/or tautomers thereof (the catalyst exists in a tautomeric form when $Z^1$ is a hydroxyl group). All or some of the chlorine atoms can be replaced by radicals Q, in which Q represents the hydroxyl group, monovalent organic radicals, such as alkoxy radicals or aryloxy radicals, halogen atoms other than chlorine, organosilicon radicals and phosphorus-containing radicals. The oxygen-containing chlorophosphazenes of formula (I) are preferably those in which no chlorine atom is replaced by a radical Q. Numerous phosphazene bases and routes for their synthesis have been described in the literature, for example in Schwesinger et al, Liebigs Ann. 1996, 1055-1081.

A further alternative catalyst which might be used as the catalyst in the present invention is any suitable compound providing a source of anions comprising at least one quadri-substituted boron atom and protons capable of interaction with at least one silanol group as defined in WO 01/79330. For this type of catalyst, it is important that the boron containing anion does not itself form a covalent bond directly to a silicon atom and that it does not decompose or rearrange to produce an anion which forms a covalent bond directly to a silicon atom. Suitable materials include those incorporating one or more boron atoms disposed within a grouping and several, for example ten or more, halogen atoms connected with each boron atom. The halogen atoms in such compound may be connected to boron atoms by linkages incorporating at least one carbon atom and are selected from fluorine, chlorine and bromine, the most preferred being fluorine.

Preferred anions incorporate one or more atoms of boron having four organic substituents thereon the most preferred being quadri-substituted borates. The organic substituents are suitably halogenated hydrocarbon groups. Such as pentafluorinated phenyl groups and bis(trifluoromethyl)phenyl groups and preferred materials have four such groups bonded to each boron atom. Examples include tetrakis (pentafluoro phenyl) borate anion (perfluorinated aryl borate ion) and the material is preferably employed as the acid of this anion namely $H^+\{(C_6F_5)_4B\}^-$. Other operative materials include anions having two quadri-substituted boron atoms, for example diperfluoroinatedaryl borate ions, e.g. $H^+\{B(C_6F_5)_3CNB(C_6F_5)_3\}^-$. Other suitable boron-containing anions for use in the process of the present invention include carboranes, for example of the formula $\{CB_9H_{10}\}^-$, $\{CB_9X^2{}_5H_5\}^-$, $\{CB_{11}H_{12}\}^-$ and $\{CB_{11}X^2{}_6H_6\}^-$ wherein each $X^2$ is the same or different and is as hereinbefore described. Carboranes may contain boron atoms which are more highly substituted than quadri-substituted, e.g. penta-substituted and hexa-substituted, and for the sake of clarity "quadri-substituted" where used herein is intended to include those anions containing quadri-substituted and higher substituted boron atoms.

The temperatures and pressures used in the process can be the same as those in the processes known to date for equilibration of organosilicon compounds. The general method may be carried out in either batch or continuous modes of operation and no heat or vacuum is required to facilitate the polymerisation (however heat and/or vacuum may be applied to influence the chemical equilibrium, if required. In the case of the phosphazene catalysed methods the polymerisation may occur at temperatures of between 50° C. to 200° C., more preferably 80° C. to 160° C.

The ring opening and equilibration reactions can be carried out under any suitable pressure, preferably carried out at a pressure below 80 kPa.

The activity of the catalyst is preferably quenched by using a neutralizing agent which reacts with the catalyst to render it non-active. Any suitable neutralising agent may be utilised. For acidic catalysts suitable base neutralising agents include primary, secondary and tertiary amines, such as diethylamine, propylamine, a mono/di and trialkanolamines for example monoethanolamine (MEA) and triethanolamine (TEA), trimethylchlorosilane, trichloroethyl phosphite, primary, secondary and tertiary amines, ammonia, amides, imides and cyclic diamines. hexamethyldisilazane, piperazine, methylmorpholine and succinamide. or $P_2O_5$. Of course, it is also possible to employ acid catalysts, e.g. $CF_3SO_3H$, which have to be neutralised with usual alkaline substances. The preferred neutralizing agents which can be utilized in practicing the preferred process of the present invention may be any of the mild acids effective for neutralizing the basic catalyst. Such neutralizing agent can be selected from, for example, phosphoric acid, tris(chloroethyl)phosphite and silyl phosphate. One particularly preferred neutralising agent is silyl phosphate because it is quite soluble in siloxane polymers and allows for rapid neutralization.

In the case of phosphazene based catalysts when the desired viscosity has been reached, the viscosity of the organosilicon compound obtained in the process can be kept constant by a procedure in which the catalyst used, or a reaction product which has been formed from this catalyst by reaction with organosilicon compound to be subjected to equilibration and likewise promotes the equilibration of organosilicon compounds, is inhibited or deactivated by addition of inhibitors or deactivators which have been employed to date in connection with phosphazenes, for example, triisononylamine, n-butyllithium, lithium siloxanolate, hexamethyldisilazane and magnesium oxide. For phosphazene base catalysts suitable neutralising agents are acids such as acetic acid, silyl phosphate, polyacrylic acid chlorine substituted silanes, silyl phosphonate or carbon dioxide.

An end-blocking agent is used to regulate the molecular weight of the polymer and/or to add functionality. End-blocking agents are a means of controlling the reactivity/polymer chain length of the polymer and as a means of introducing functionality to the resulting polymer. The end-blocking agent, which halts the polymerization reaction and thereby limits the average molecular weight of the resulting polymer. Any suitable end-blocking agent known to those skilled in the art may be utilised and typically will be chosen with the end use of the polymer in mind. Suitable end-blocking agents include short chain (e.g. from a degree of polymerisation of from 2 to 27 Silicon atoms) alkenyl dialkyl terminated polydimethylsiloxanes, polydimethylsiloxanes having terminal groups containing Si—H bonds trialkylsiloxy-terminated polydimethylsiloxanes (having from 2 to 1000 silicon atoms in the polymer backbone), disalkylsilanol terminated polydimethylsiloxanes (having from 2 to 2000 silicon atoms in the polymer backbone), or mixtures thereof, Other potential end-blockers include silanes, e.g. alkoxy functional silanes and silanols such as trimethyl silanol, trimethylmethoxysilane, methyltrimethoxysilane. They also include siloxanes e.g. trimethylsilyl end-blocked polydimethylsiloxanes, dimethylsilanol end-blocked polydimethyl siloxanes, trimethylsiloxane end-blocked dimethyl methylphenyl siloxane. Hydrolysable groups which may be introduced using end-blockers and where required subsequent reactions include —$SiOH_3$, —$(R^a)SiOH_2$, —$(R^a)_2SiOH$, —$R^aSi(OR^b)_2$, —$Si(OR^b)_3$, —$R^a_2SiOR^b$ or —$R^a_2Si-R^c-SiR^d_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to six silicon atoms; and p has the value 0, 1 or 2. Water also acts as a end-blocker, with the introduction of hydroxy functional groups.

Any suitable method for making the polymer in accordance with the method of the present invention may be used. The diluent and catalyst may be added in any order to the monomer. Mixing is continued until the viscosity of the resulting product becomes constant or starts to decrease with time at which point the catalyst is quenched/neutralised using for example the neutralising agents hereinbefore described.

Preferably the or each organic based diluent is/are one or more extenders and/or plasticisers. Generally the diluent(s) used in accordance with the present invention are not intended to chemically bond to the monomer/oligomer starting materials or intermediate or final polymerisation product. However, some chemical bonding and/or reversible interactions between the polymer reaction products and diluent(s) may occur. Preferably, chemical bonding, which takes place between the polymer and the diluent(s) occurs with substituents along the backbone of the polymer rather than with polymer end groups so as to form a cross-linking network between polymer and diluent thereby providing a polymer product which is less likely to result in diluent loss and/or shrinkage when used in for example a sealant composition. For the sake of clarification with respect to this paragraph the term "chemically bond" is intended to mean the formation of covalent or the like bonds and not mere chemical interactions such as hydrogen bonding or the like.

Any suitable extender and/or plasticiser or combination of extenders and/or plasticisers which is compatible with the polymer may be utilised.

These include each of the following alone or in combination with others from the list:—
polyisobutylenes (PIB),
phosphate esters such as trioctyl phosphate
polyalkylbenzenes,
linear and/or branched alkylbenzenes such as heavy alkylates, dodecyl benzene and other alkylarenes,
esters of aliphatic monocarboxylic acids;
dialkyl phthalates wherein the alkyl group may be linear and/or branched and contains from six to 20 carbon atoms such as dioctyl, dihexyl, dinonyl, didecyl, diallanyl and other phthalates;
adipate, azelate, oleate and sebacate esters,
tung oil,
fatty acids and/or esters of fatty acids.
polyols such as ethylene glycol and its derivatives,
organic phosphates such as tricresyl phosphate and/or triphenyl phosphates and/or castor oil.
linear or branched mono unsaturated hydrocarbons such as linear or branched alkenes or mixtures thereof containing from 12 to 25 carbon atoms; and/or
mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise from 5 to 25 carbon atoms per molecule. Preferably the extender may comprise any suitable mineral oil, examples include linear or branched mono unsaturated hydrocarbons such as linear or branched alkenes or mixtures thereof containing at least 12, e.g. from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise at least 10, preferably at least 12 and most preferably greater than 20 carbon atoms per molecule.

Preferred extenders include the mineral oil fractions, alkylcycloaliphatic compounds and alkybenzenes including polyalkylbenzenes.

Any suitable mixture of mineral oil fractions may be utilised as the extender in the present invention but high molecular weight extenders (e.g. >number average molecular weight of 220) are particularly preferred. Examples include:—
alkylcyclohexanes (molecular weight>220);
paraffinic hydrocarbons and mixtures thereof containing from 1 to 99%, preferably from 15 to 80% n-paraffinic and/or isoparaffinic hydrocarbons (linear branched paraffinic) and 1 to 99%, preferably 85 to 20% cyclic hydrocarbons (naphthenic) and a maximum of 3%, preferably a maximum of 1% aromatic carbon atoms. The cyclic paraffinic hydrocarbons (naphthenics) may contain cyclic and/or polycyclic hydrocarbons. Any suitable mixture of mineral oil fractions may be used, e.g. mixtures containing
  (i) 60 to 80% paraffinic and 20 to 40% naphthenic and a maximum of 1% aromatic carbon atoms;
  (ii) 30-50%, preferably 35 to 45% naphthenic and 70 to 50% paraffinic and or isoparaffinic oils;
  (iii) hydrocarbon fluids containing more than 60 wt. % naphthenics, at least 20 wt. % polycyclic naphthenics and an ASTM D-86 boiling point of greater than 235° C.;
  (iv) hydrocarbon fluid having greater than 40 parts by weight naphthenic hydrocarbons and less than 60 parts by weight paraffinic and/or isoparaffinic hydrocarbons based on 100 parts by weight of hydrocarbons.

Preferably the mineral oil based extender or mixture thereof comprises at least one of the following parameters:—

(i) a molecular weight of greater than 150, most preferably greater than 200;
(ii) an initial boiling point equal to or greater than 230° C. (according to ASTM D 86).
(iii) a viscosity density constant value of less than or equal to 0.9; (according to ASTM 2501)
(iv) an average of at least 12 carbon atoms per molecule, most preferably 12 to 30 carbon atoms per molecule;
(v) an aniline point equal to or greater than 70° C., most preferably the aniline point is from 80 to 110° C. (according to ASTM D 611);
(vi) a naphthenic content of from 20 to 70% by weight of the extender and a mineral oil based extender has a paraffinic content of from 30 to 80% by weight of the extender according to ASTM D 3238);
(vii) a pour point of from −50 to 60° C. (according to ASTM D 97);
(viii) a kinematic viscosity of from 1 to 20 cSt at 40° C. (according to ASTM D 445)
(ix) a specific gravity of from 0.7 to 1.1 (according to ASTM D1298);
(x) a refractive index of from 1.1 to 1.8. at 20° C. (according to ASTM D 1218)
(xi) a density at 15° C. of greater than 700 kg/m³ (according to ASTM D4052) and/or
(xii) a flash point of greater than 100° C., more preferably greater than 110° C. (according to ASTM D 93)
(xiii) a saybolt colour of at least +30 (according to ASTM D 156)
(xiv) a water content of less than or equal to 250 ppm (according to ASTM D6304)
(xv) a Sulphur content of less than 2.5 ppm (according to ASTM D 4927)

The alkylbenzene compounds suitable for use include heavy alkylate alkylbenzene or an alkylcycloaliphatic compound. Examples of alkyl substituted aryl compounds useful as extenders and/or plasticisers are compounds which have aryl groups, especially benzene substituted by alkyl and possibly other substituents, and a molecular weight of at least 200. Examples of such extenders as described in U.S. Pat. No. 4,312,801, the content of which is incorporated herein by reference. These compounds can be represented by general formula (I), (II), (III) and (IV)

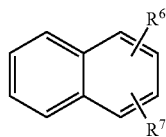
(I)

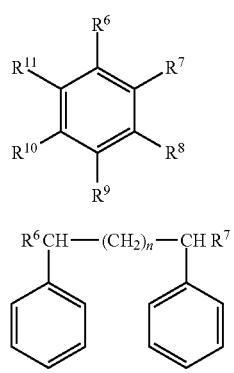
(II)

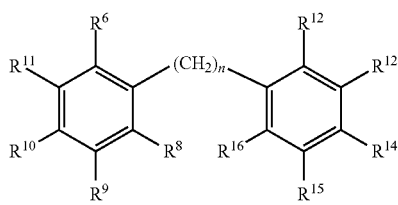
(III)

(IV)

where $R^6$ is an alkyl chain of from 1 to 30 carbon atoms, each of $R^7$ through to $R^{16}$ is independently selected from hydrogen, alkyl, alkenyl, alkynyl, halogen, haloalkyl, nitrile, amine, amide, an ether such as an alkyl ether or an ester such as an alkyl ester group, and n is an integer of from 1 to 25.

In particular, the extender used in accordance with the process of the present invention is of formula (I) where each of $R^7$, $R^8$, $R^9$, $R^{10}$ and $R^{11}$ is hydrogen and $R^6$ is a $C_{10}$-$C_{13}$ alkyl group. A particularly useful source of such compounds are the so-called "heavy alkylates", which are recoverable from oil refineries after oil distillation. Generally distillation takes place at temperatures in the range of from 230-330° C., and the heavy alkylates are present in the fraction remaining after the lighter fractions have been distilled off.

Examples of alkylcycloaliphatic compounds are substituted cyclohexanes with a molecular weight in excess of 220. Examples of such compounds are described in EP 0842974, the content of which is incorporated herein by reference. Such compounds may be represented by general formula (V).

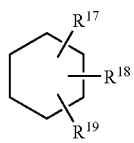
(V)

where $R^{17}$ is a straight or branched alkyl group of from 1 to 25 carbon atoms, and $R^{18}$ and $R^{19}$ are independently selected from hydrogen or a $C_{1-25}$ straight or branched chain alkyl group.

The amount of diluent which may be included in the composition will depend upon factors such as the purpose to which the composition is to be put, the molecular weight of the diluent(s) concerned etc. Polymer products in accordance with the present invention may contain from 5% w/w up to 70% w/w diluent (based on the combined weight of polymer and diluent(s)) depending upon these factors. In general however, the higher the molecular weight of the diluent(s), the less will be tolerated in the composition. Typical compositions will contain up to 70% w/w diluent(s). More suitable polymer products comprise from 30-60% w/w of a linear diluent(s) whereas 25-35% w/w will be more preferred when the diluent is a heavy alkylate.

One of the most important aspects of the present invention is the fact that by polymerising the polymer in the presence of the diluent(s) the resulting polymer/processing aids and/or polymer/plasticiser mix throughout the polymerisation process has a significantly lower viscosity than would normally be expected because the viscosity reducing diluent(s) is/are present in the polymer mixture as it polymerises. It is to be understood that this is the case even when only a small amount e.g. 5-20% by weight is present for the polymerisation process in accordance with the present invention. For example using the standard process of mixing diluent(s) with filler and ready made polymer together one would typically only be able to incorporate approximately 28% by weight of diluent(s) in an 80 000 mPa·s polymer because of problems with handling and blending using polymers of greater viscosity. By introducing the diluent(s) prior to polymerisation, blending problems are avoided and the resulting polymers may be utilised for alternative applications than are usually utilised using organopolysiloxane gums of several million mPa·s.

The process of the present invention enables a significantly greater amount of diluent(s) to be used, in conjunction with polymers having viscosities not previously contemplated because of handling problems. The ratio between the diluent(s) and the silicone phase that can be achieved is dependent on the miscibility of the diluent(s) in the polydimethylsiloxanes and vice versa. The miscibility was found to depend at least in part, on the molecular weight of the polydimethylsiloxanes.

This combination also provides the user with formulations comprising the diluted polymer of the present invention with a variety of improved physical characteristics, not least the elasticity of resulting products, because of the use of polymers having polymer chain length/viscosities which hitherto would not have been possible to use. Applications include, sealants formulations, coating formulations, high consistency organopolysiloxane gum formulations for high consistency rubber applications, and for dispersions thereof in volatile and non-volatile alkylsilicone fluids for use in personal care products.

Preferably the resulting organopolysiloxane product prepared in accordance with the process of the present invention has a general formula $$X^3\text{-}A\text{-}X^1 \qquad (1)$$

where $X^3$ and $X^1$ are terminal silyl groups the functionality of which is substantially determined by the end-blocking agent used in the polymerisation process, which may be any suitable end-blocker as hereinbefore described. The group A preferably includes siloxane units of formula (2)

$$\text{—}(R^5{}_s SiO_{(4-s/2)})\text{—} \qquad (2)$$

in which each $R^5$ is independently an organic group such as a hydrocarbyl group having from 1 to 10 carbon atoms optionally substituted with one or more halogen group such as chlorine or fluorine and s is 0, 1 or 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group.

Suitably, at least some and preferably substantially all of the $R^5$ groups are methyl. A in the compound of formula (1) may include any suitable siloxane polymer chain which give a polymer viscosity (in the absence of extenders in accordance with the present invention of up to 100 000 000 mPa·s, i.e. up to or even more than 200 000 units of formula (2). Preferred materials are linear materials i.e. s=2 for all chain units. Preferred materials have polydiorgano-siloxane chains according to the general formula (3)

$$\text{—}(R^5{}_2 SiO)_t\text{—} \qquad (3)$$

in which each $R^5$ is the same or different, is defined as above but is preferably an alkyl group, preferably a methyl or ethyl group and t has a value of up to at least 200 000. If appropriate additional diluent may be added to the composition after polymerisation has been completed.

In accordance with the present invention there is provided a method of making a moisture curable composition capable of cure to an elastomeric body comprising the steps of:—
(i) Preparing an organopolysiloxane polymer as hereinbefore described using an hydroxy or otherwise hydrolysable group containing end-blocker
(ii) compounding the resulting diluted organopolysiloxane polymer with
(iii) (i) a suitable cross-linking agent which is reactive with the organopolysiloxane polymer,
(ii) a suitable condensation catalyst and optionally
(iii) filler.

In one embodiment the process is used to prepare a one or two part organopolysiloxane sealant composition.

In accordance with a still further embodiment of the present invention there is provided a moisture curable composition capable of cure to an elastomeric body, the composition comprising
a) A diluted organopolysiloxane having not less than two silicon-bonded condensable (preferably hydroxyl or hydrolysable) obtained by means of the process in accordance with the present invention;
b) A siloxane and/or silane cross-linker having at least two groups per molecule which are reactable with the hydroxyl or hydrolysable groups in (a);
c) Optionally one or more fillers and
d) a suitable cure catalyst Preferably the organopolysiloxane component (a) for the moisture curable formulation in accordance with the present invention is a polysiloxane containing polymer containing at least two hydroxyl or hydrolysable groups, most preferably the polymer comprises terminal hydroxyl or hydrolysable groups. Preferably the polymer has the general formula $$X^3\text{-}A\text{-}X^1 \qquad (1)$$

where $X^3$ and $X^1$ are independently selected from silyl groups which terminate in hydroxyl or hydrolysable groups and A is as hereinbefore described. Examples of hydroxyl-terminating or hydrolysable groups $X^3$ or $X^1$ include —SiOH$_3$, —(R$^a$)SiOH$_2$, —(R$^a$)$_2$SiOH, —R$^a$Si(OR$^b$)$_2$, —Si(OR$^b$)$_3$, —R$^a$$_2$SiOR$^b$ or

—R$^a$$_2$Si—R$^c$—SiR$^d$$_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2. Suitably for this embodiment of the invention, $X^3$ and/or $X^1$ are groups which are hydrolysable in the presence of moisture.

Any suitable cross-linker may be used. The cross-linker used (b) in the moisture curable composition as hereinbefore described is preferably a silane compound containing hydrolysable groups. These include one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy).

In the case of siloxane based cross-linkers the molecular structure can be straight chained, branched, or cyclic.

The cross-linker may have two but preferably has three or four silicon-bonded condensable (preferably hydrolysable) groups per molecule. When the cross-linker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as cross-linkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltri-oximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

The amount of cross-linker present in the composition will depend upon the particular nature of the cross-linker and in particular, the molecular weight of the molecule selected. The compositions suitably contain cross-linker in at least a stoichiometric amount as compared to the polymeric material described above. Compositions may contain, for example, from 2-30% w/w of cross-linker, but generally from 2 to 10% w/w. Acetoxy cross-linkers may typically be present in amounts of from 3 to 8% w/w preferably 4 to 6% w/w whilst oximino cross-linkers, which have generally higher molecular weights will typically comprise from 3-8% w/w.

The composition further comprises a condensation catalyst. This increases the speed at which the composition cures. The catalyst chosen for inclusion in a particular silicone sealant composition depends upon the speed of cure required. Any suitable condensation catalyst may be utilised to cure the composition including tin, lead, antimony, iron, cadmium, barium, manganese, zinc, chromium, cobalt, nickel, titanium, aluminium, gallium or germanium and zirconium based catalysts such as organic tin metal catalysts and 2-ethylhexoates of iron, cobalt, manganese, lead and zinc may alternatively be used. Organotin, titanate and/or zirconate based catalysts are preferred.

Silicone sealant compositions which contain oximosilanes or acetoxysilanes generally use a tin catalyst for curing, such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate. Dibutyltin dilaurate, dibutyltin diacetate are particularly preferred.

For compositions which include alkoxysilane cross-linker compounds, the preferred curing catalysts are titanate or zirconate compounds. Such titanates may comprise a compound according to the general formula $Ti[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R include but are not restricted to methyl, ethyl, propyl, isopropyl, butyl, tertiary butyl and a branched secondary alkyl group such as 2,4-dimethyl-3-pentyl. Preferably, when each R is the same, R is an isopropyl, branched secondary alkyl group or a tertiary alkyl group, in particular, tertiary butyl. Examples include tetrabutyltitanate, tetraisopropyltitanate, or chelated titanates or zirconates. The chelation may be with any suitable chelating agent such as an alkyl acetylacetonate such as methyl or ethylacetylacetonate, suitable catalysts being. For example, diisopropyl bis(acetylacetonyl)titanate, diisopropyl bis(ethylacetoacetonyl)titanate, diisopropoxytitanium Bis (Ethylacetoacetate) and the like. Further examples of suitable catalysts are described in EP1254192 which is incorporated herein by reference. The amount of catalyst used depends on the cure system being used but typically is from 0.01 to 3% by weight of the total composition Preferably the catalyst, component (d), will be present in an amount of from about 0.1 to 3 weight % of the composition component (d) may be present in a greater amount in cases where chelating agents are used.

Compositions of this invention may contain, as optional constituents, other ingredients which are conventional to the formulation of silicone elastomeric products such as sealants and the like. For example, the compositions will normally contain one or more finely divided, reinforcing fillers such as high surface area fumed and precipitated silicas including rice hull ash and to a degree calcium carbonate, or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

The proportion of such fillers when employed will depend on the properties desired in the elastomer-forming composition and the cured elastomer. Usually the filler content of the composition will reside within the range from about 5 to about 800 parts by weight, preferably 25 to 400 parts by weight per 100 parts by weight of the polymer excluding the diluent portion.

Other ingredients which may be included in the compositions include but are not restricted to co-catalysts for accelerating the cure of the composition such as metal salts of carboxylic acids and amines; rheological modifiers; Adhesion promoters, pigments, Heat stabilizers, Flame retardants, UV stabilizers, cure modifiers, chain extenders, electrically and/or heat conductive fillers, Fungicides and/or biocides and the like (which may suitably by present in an amount of from 0 to 1% by weight), water scavengers, (typically the same compounds as those used as cross-linkers or silazanes). It will be appreciated that some of the additives are included in more than one list of additives. Such additives would then have the ability to function in all the different ways referred to.

The rheological additives include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols. In some instances the rheological additives above may also act to enhance adhesion.

Any suitable adhesion promoter(s) may be incorporated in a sealant composition in accordance with the present invention. These may include for example alkoxy silanes such as aminoalkylalkoxy silanes, epoxyalkylalkoxy silanes, for example, 3-glycidoxypropyltrimethoxysilane and, mercaptoalkylalkoxy silanes and γ-aminopropyl triethoxysilane. Isocyanurates containing silicon groups such as 1,3,5-tris(trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane epoxyalkylalkoxy silane, mercaptoalkylalkoxy silane, and derivatives thereof.

Chain extenders may include difunctional silanes which extend the length of the polysiloxane polymer chains before cross-linking occurs and, thereby, reduce the modulus of elongation of the cured elastomer. Chain extenders and cross-linkers compete in their reactions with the functional polymer ends; in order to achieve noticeable chain extension, the difunctional silane must have substantially higher reactivity than the typical trifunctional cross-linker. Suitable chain extenders for condensation cure systems are, for example, methylvinyl bis(N-methylacetamido)silane, methylhydrogendiacetoxysilane, dimethylbis(N-diethylaminoxy)silane and dimethylbis(sec.-butylamino)silane.

Heat stabilizers may include Iron oxides and carbon blacks, Iron carboxylate salts, cerium hydrate, titania, barium zirconate, cerium, manganese and zirconium octoates, and porphyrins.

Flame retardants may include for example, carbon black, hydrated aluminium hydroxide, magnesium hydroxide and silicates such as wollastonite, platinum and platinum compounds.

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

Any suitable Fungicides and biocides may be utilised, these include N-substituted benzimidazole carbamate, benzimidazolylcarbamate such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]}carbamate. 10,10'-oxybisphenoxarsine (trade name: Vinyzene, OBPA), di-iodomethyl-para-tolylsulfone, benzothiophene-2-cyclohexylcarboxamide-S,S-dioxide, N-(fluordichloridemethylthio)phthalimide (trade names: Fluor-Folper, Preventol A3). Methyl-benzimideazol-2-ylcarbamate (trade names: Carbendazim, Preventol BCM), Zincbis(2-pyridylthio-1-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or Triazolyl-compounds, such as tebuconazol in combination with zeolites containing silver.

The compositions are preferably room temperature vulcanisable compositions in that they cure at room temperature without heating.

The compositions can be prepared by mixing the ingredients employing any suitable mixing equipment. Other components may be added as necessary. For example preferred one part, moisture curable compositions may be made by mixing together the extended polysiloxane having hydroxyl or hydrolysable groups and any organosilicon plasticizer or filler used, and mixing this with a pre-mix of the cross-linker and catalyst. UV-stabilisers pigments and other additives may be added to the mixture at any desired stage.

After mixing, the compositions may be stored under substantially anhydrous conditions, for example in sealed containers, until required for use.

In one embodiment the process is used to prepare a one or two part organopolysiloxane sealant composition. One part formulations are stable in storage but cure on exposure to atmospheric moisture and may be employed in a variety of applications, for example as coating, caulking and encapsulating materials. A two part composition comprises in the first part diluted polymer and filler (when required) and in the second part catalyst and cross-linker are provided for mixing in an appropriate ratio (e.g. 10:1) immediately prior to use. The additional additives to be discussed below may be provided in either part 1 or part 2 of the part composition but are preferably added in part two.

They are, however, particularly suitable for sealing joints, cavities and other spaces in articles and structures which are subject to relative movement. They are thus particularly suitable as glazing sealants and for sealing building structures where the visual appearance of the sealant is important.

The polymerisation in the presence of the diluent gives several advantages with respect to sealant formulations. In respect to rheology, the increase in polymer chain length enabled due to the presence of the diluent compensates for the amount of diluent present in the diluted sealant and as such the viscosity of the diluted polymer is significantly higher than it would be if the diluent had been added to a standard polymer used in sealant formulations currently having for example a viscosity of 80000 to 100 000 mPa·s at 25° C. The lower modulus of the resulting sealant additionally means that more movement is possible in the joint being sealed, to the extent that even if diluent loss occurs, the effective modulus caused by the presence of high molecular weight polymers which may be prepared in accordance with the process of the present invention is able to compensate for stress caused to the seal due to shrinkage. The product of the process of the present invention gives superior processing advantages due to the comparatively low viscosity of the diluted polymer when considering the molecular weight of the polymer.

Thus in a further aspect, the invention provides a method of sealing a space between two units, said method comprising applying a composition as described above and causing or allowing the composition to cure. Suitable units include glazing structures or building units as described above and these form a further aspect of the invention.

The applicants have found that sealant formulations The applicants have found that sealant formulations prepared according to this invention—provides the user with a very highly elastic sealant subsequent to curing because of the high chain length/viscosity of the polymer being used (when one considers the viscosity in the absence of the diluent). Such sealants provide an elongation at break of significantly greater than 650%.

A further advantage of polymers made by the process of the present invention is that they contain very low levels of cyclic siloxanes after polymerisation has completed.

In a further application of the present invention the diluted polymer resulting from the polymerisation process may be dispersed in a volatile or non-volatile low molecular weight organopolysiloxane containing fluid having a viscosity of between 4 and 100 mPa·s for use in personal care applications.

The volatile silicone is appropriately a low viscosity dialkylsiloxane (typically a dimethylsiloxane) fluid which preferably contains dimethylsiloxane units and optionally trimethylsiloxane units and preferably a viscosity of less than about 10 mPa·s at 25° C. The low viscosity dialkylsiloxane fluid, may be either a cyclopolysiloxane having a degree of polymerisation of from 3 to 10 or a linear siloxane compound having a degree of polymerisation of from 1 to 10, preferably between 1 and 5.

The cyclopolysiloxane compounds have been assigned the adopted name "CYCLOMETHICONE" by The Cosmetics, Toiletries and Fragrance Association, Inc., Washington, D.C. (CTFA). Both the cyclopolysiloxanes and the linear siloxanes are clear fluids, and are essentially odourless, nontoxic, non-greasy and nonstinging. Cosmetically, these volatile alkylsilicone fluids are non-irritating to skin, and exhibit enhanced spreadability and ease of rub-out when applied. Once applied, the materials evaporate leaving behind no residue.

Alkylsilicone fluids which are operable in accordance with the present invention leave substantially no residue after thirty minutes at room temperature when one gram of fluid is placed at the centre of a No. 1 circular filter paper having a diameter of 185 mm supported at its perimeter in open room atmosphere. Representative linear alkylsilicone fluids include hexamethyldisiloxane which has a boiling point of 99.5° C. and octamethyltrisiloxane which has a boiling point of 152° C. Representative cyclic alkylsilicone fluids suitable for the present application include hexamethylcyclotrisiloxane which has a boiling point of 133° C.; octamethylcyclotetrasiloxane which has a boiling point of 171° C. and decamethylcyclopentasiloxane which has a boiling point of 205° C. These alkylsilicone fluids may be used alone, or as mixtures in combinations of two or more of the individual fluids. Mixtures of the alkylsilicone fluids will result in a volatile material having an evaporating behaviour different from any one of the individual alkylsilicone fluids. The alkylsilicone fluids and their methods of preparation are known in the art, and such fluids are commercially available.

In some instances, it may be desirable to replace one or more of the methyl groups in the alkylsilicone fluid with other groups. Thus, there may be substituted groups such as alkyl radicals having two to twelve carbon atoms; aryl radicals having six to ten carbon atoms; amine groups; vinyl; hydroxy; haloalkyl groups; aralkyl groups; and acrylate groups.

Compositions in accordance with the present invention comprising a blend of the diluted polymer dispersed in the alkylsilicone fluid may additionally contain a surfactant selected from the group consisting of anionic and amphoteric surfactants. The surfactant system should provide an acceptable level of foam on the hair and be capable of cleaning the hair, and may comprise one or more water soluble detergents, i.e., an anionic or amphoteric surfactant. Suitable anionic detergents include sulfonated and sulphated alkyl, aralkyl and alkaryl anionic detergents; alkyl succinates; alkyl sulfosuccinates and N-alkyl sarcosinates. Especially preferred are the sodium, magnesium, ammonium, and the mono-, di- and triethanolamine salts of alkyl and aralkyl sulphates as well as the salts of alkaryl sulfonates. The alkyl groups of the detergents generally have a total of from about 12 to 21 carbon atoms, may be unsaturated, and are preferably fatty alkyl groups. The sulphates may be sulphate ethers containing one to ten ethylene oxide or propylene oxide units per molecule. Preferably, the sulphate ethers contain 2 to 3 ethylene oxide units.

Typical anionic detergents include, among others, sodium lauryl sulphate, sodium lauryl ether sulphate, ammonium lauryl sulphate, triethanolamine lauryl sulphate, sodium C14-16 olefin sulfonate, ammonium pareth-25 sulphate (ammonium salt of a sulphated polyethylene glycol ether of a mixture of synthetic C12-15 fatty alcohols), sodium myristyl ether sulphate, ammonium lauryl ether sulphate, disodium monooleamidosulfosuccinate, ammonium lauryl sulfosuccinate, sodium dodecylbenzene sulfonate, triethanolamine dodecylbenzene sulfonate and sodium N-lauryl sarcosinate. The most preferred anionic detergents are the lauryl sulphates, particularly monoethanolamine, triethanolamine, ammonium and sodium lauryl sulphates. Sodium lauryl ether sulphate is also very suitable for use in the compositions in accordance with the present invention.

Surfactants generally classified as amphoteric or ampholytic detergents include, among others, cocoamphocarboxyglycinate, cocoamphocarboxypropionate, cocobetaine, N-cocamidopropyldimethylglycine, and N-lauryl-N-carboxymethyl-N-(2-hydroxyethyl)ethylenediamine. Other suitable amphoteric detergents include the quaternary cycloimidates, betaines such as alpha-(tetradecyldimethylammonio)acetate, beta-(hexadecyldiethylammonio)propionate, and gamma-(dodecyldimethylammonio)butyrate, and sultaines such as 3-(dodecyldimethylammonio)-propane-1-sulfonate, and 3-(tetradecyldimethylammonio)ethane-1-sulfonate.

The compositions of this invention may contain a nonionic surfactant. The nonionic surfactants of the present invention are selected from the group consisting of fatty acid alkanolamide and amine oxide surfactants. The fatty acid alkanolamides are nonionic surfactants obtained by reacting alkanolamines such as monoethanolamine, diethanolamine, monoisopropanolamine, or diisopropanolamine with a fatty acid or fatty acid ester to form the amide. The hydrophobic portion of the nonionic surfactant is provided by a fatty acid hydrocarbon chain which generally has from 10 to 21 carbon atoms. The fatty acid alkanolamide surfactants include, for example, fatty acid diethanolamides such as isostearic acid diethanolamide, lauric acid diethanolamide, capric acid diethanolamide, coconut fatty acid diethanolamide, linoleic acid diethanolamides, myristic acid diethanolamide, oleic acid diethanolamide, and stearic acid diethanolamide; fatty acid monoethanolamides such as coconut fatty acid monoethanolamide; and fatty acid monoisopropanolamides such as oleic acid monoisopropanolamide and lauric acid monoisopropanolamide.

The amine oxides are well known nonionic surfactants usually obtained by oxidizing a tertiary amine to form the amine oxide. They are sometimes also referred to as polar nonionic surfactants. Amine oxide surfactants include, for example, the N-alkyl amine oxides such as N-cocodimethylamine oxide, N-lauryl dimethylamine oxide, N-myristyl dimethylamine oxide, and N-stearyl dimethylamine oxide; the N-acyl amine oxides such as N-cocamidopropyl dimethylamine oxide and N-tallowamidopropyl dimethylamine oxide; and N-alkoxyalkyl amine oxides such as bis(2-hydroxyethyl) C12-15 alkoxy-propylamine oxide. The hydrophobic portion of the amine oxide surfactants is generally provided by a fatty hydrocarbon chain containing from 10 to 21 carbon atoms.

For purposes of this invention the alkanolamide and amine oxide surfactants are preferred. In general, the fatty acid diethanolamides and N-alkyl dimethylamine oxides are preferred for use in the compositions. Especially preferred are the fatty acid diethanolamides and N-alkyl dimethylamine oxides where the fatty hydrocarbon chain contains from 10 to 18 carbon atoms. For example, especially preferred nonionic surfactants include lauric acid diethanolamide, N-lauryl dimethylamine oxide, coconut acid diethanolamide, myristic acid diethanolamide, and oleic acid diethanolamide.

Additional categories of surfactant materials may also be included such as cationic and zwitterionic surfactants, and representative compounds are set forth in detail in U.S. Pat. No. 4,902,499, issued Feb. 20, 1990, which is considered to be incorporated herein by reference.

Other adjuvants may be added to compositions in accordance with the present invention comprising a blend of the diluted polymer dispersed in the alkylsilicone fluid include for example thickeners, perfumes, colorants, electrolytes, pH control ingredients, foam boosters and foam stabilizers, antimicrobials, antioxidants, ultraviolet light absorbers and medicaments. For example, it is sometimes preferred to employ a thickener in the compositions to facilitate the hand application of the composition to the hair. Thickeners are preferably used in sufficient quantities to provide a more luxurious effect. For example, viscosities within the range of 6,000 to 12,000 mPa·s measured at 25° C. Suitable thickeners, include, among others, sodium alginate, gum arabic, polyoxyethylene, guar gum, hydroxypropyl guar gum, cellulose derivatives such as methylcellulose, methylhydroxypropylcellulose, hydroxypropylcellulose, polypropylhydroxyethylcellulose, starch and starch derivatives such as hydroxyethylamylose, and starch amylose, locust bean gum, electrolytes such as sodium or ammonium chloride, saccharides such as fructose and glucose, and derivatives of saccharides such as PEG-120 methyl glucose dioleate.

The perfumes which can be used in the compositions are cosmetically acceptable perfumes. Colorants are used to confer a colour to the composition and may generally be used. Although not required, it is preferred to employ an acid to adjust the pH within the range of 5 to 9 or more preferably within the range of 6 to 8 in the compositions of this invention. Any water soluble acid such as a carboxylic acid or a mineral acid is suitable. For example, suitable acids include mineral acids such as hydrochloric, sulphuric, and phosphoric, monocarboxylic acids such as acetic acid, lactic acid, or propionic acid; and polycarboxylic acids such as succinic acid, adipic acid and citric acid.

If for special purposes additional conditioners are desired, they may be added. For example, any of the well-known organic cationic hair conditioning components may be added. Some cationic conditioning components that may be used in the present invention to provide hair grooming include quaternary nitrogen derivatives of cellulose ethers, homopolymers of dimethyldiallyl-ammonium chloride, copolymers of acrylamide and dimethyldiallylammonium chloride, homopolymers or copolymers derived from acrylic acid or methacrylic acid containing cationic nitrogen functional groups attached to the polymer via ester or amide linkages, polycondensation products of N,N'-bis-(2,3-epoxypropyl)-piperazine or of piperazine-bis-acrylamide and piperazine, poly-(dimethylbutenylammonium chloride)-.alpha.,.omega.-bis-(triethanol-ammonium) chloride, and copolymers of vinylpyrrolidone and acrylic acid esters with quaternary nitrogen functionality. The above cationic organic polymers and others are described in more detail in U.S. Pat. No. 4,240,450 which is hereby incorporated by reference to further describe the cationic organic polymers. Other categories of conditioners such as monomeric quaternary amine salts may also be employed.

A preservative may be required and representative preservatives which may be employed include about 0.1-0.2 weight percent of compounds such as formaldehyde, dimethyloldimethylhydantoin, 5-bromo-5-nitro-1,3-dioxane, methyl- and propyl para-hydroxybenzoates, and mixtures of such benzoates with sodium dehydroacetate, sorbic acid, and imidazolidinyl urea.

Compositions in accordance with the present invention comprising a blend of the diluted polymer dispersed in the alkylsilicone fluid may additionally contain may also be formulated to include dyes, colorants, reducing agents, neutralizing agents, and preservatives, necessary for their application as permanent wave systems or hair dyes, for example. The active formulation can be applied in several different forms including lotions, gels, mousses, aerosols, and pump sprays, for example, and as conditioners and shampoos. The active ingredient may include a carrier, and suitable carrier fluids for hair care formulations are water as well as, for example, such fluids as alcohols namely ethanol or isopropanol, hydrocarbons and halogenated hydrocarbons as mineral spirits and trichloroethane, cyclic siloxanes, and aerosol propellants.

When the composition is intended for aerosol application, propellant gases can be included such as carbon dioxide, nitrogen, nitrous oxide, volatile hydrocarbons such as butane, isobutane, or propane and chlorinated or fluorinated hydrocarbons such as dichlorodifluoromethane and dichlorotetrafluoroethane or dimethylether.

Resulting products may be in the form of ointments, creams, gels, pastes, foams, aerosols and the like. They may be present in pharmaceutical, medical and/or therapeutic applications analgesic; anaesthetic; anti-acne; antibacterial; anti-yeast; antifungal; antivirals; antidandruff; antidermatitis; antipruritic; antiemetic; anti-motion sickness; anti-inflammatory; antihyperkeratotic; anti-dry skin; antiperspirant; antipsoriatic; antiseborrheic; hair conditioning; hair treatment; anti-aging; antiwrinkle; anti-asthmatic; bronchodilator; sunscreen; antihistamine; skin-lightening; depigmenting; wound-healing; vitamin; corticosteroid; tanning or hormonal. Products of this type are commonly used include hair care products such as shampoos, hair conditioners, hair colorants, hairstyling preparations, such as setting lotions and hairsprays and permanent wave preparations, skin care products such as facial or body powders, blushers, eyeshadows, eyeliners, bath grains or pellets, lipsticks, moisturisers, cosmetics, hand and body lotions, concealers, compact powders, foundations. and sun care products such as sun screen formulations.

In a still further embodiment of the present invention a diluted polymer in accordance with the present invention may be incorporated into a high viscosity silicone rubber composition In accordance with the present invention there is provided a method of making a silicone rubber composition comprising the steps of:—

Preparing a diluted organopolysiloxane containing polymer as hereinbefore described optionally with an alkenyl group or condensable group or silyl-hydride or trimethylsilyl containing end-blocker and optionally with a siloxane based diluent; compounding the resulting diluted organopolysiloxane polymer with one or more reinforcing and/or non reinforcing fillers and
a curing agent.

In the present embodiment any filler or combination of fillers as hereinbefore described may be utilised. Usually the filler content of the composition will reside within the range from about 5 to about 200 parts by weight per 100 parts by weight of the polymer excluding the diluent portion.

A curing agent, as noted above, is required and compounds which can be used herein include organic peroxides such as dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, tertiary-butyl-trimethyl peroxide, tertiary-butyl-tertiary-butyl-tertiary-triphenyl peroxide, 1,1-bis(t-butylperoxy)-3,3, 5-trimethylcyclohexane, and t-butyl perbenzoate. The most suitable peroxide based curing agents are benzoyl peroxide, 2,4-dichlorobenzoyl peroxide, di-t-butyl peroxide, and dicumyl peroxide. Such organic peroxides are used at up to 10 parts per 100 parts of the combination of polymer, filler and optional additives. Preferably between 0.2 and 2 parts of peroxide are used.

The present compositions can also be cured and/or crosslinked by a hydrosilylation reaction catalyst in combination with an organohydrogensiloxane as the curing agent instead of an organic peroxide, providing a majority of polymer molecules which contain at least two unsaturated groups suitable for cross-linking with the organohydrogensiloxane. These groups are typically alkenyl groups, most preferably vinyl groups. To effect curing of the present composition, the organohydrogensiloxane must contain more than two silicon bonded hydrogen atoms per molecule. The organohydrogensiloxane can contain, for example, from about 4-20 silicon atoms per molecule, and have a viscosity of up to about 10 Pa·s at 25° C. The silicon-bonded organic groups present in the organohydrogensiloxane can include substituted and unsubstituted alkyl groups of 1-4 carbon atoms that are otherwise free of ethylenic or acetylenic unsaturation.

Preferably the hydrosilylation catalyst may be any hydrosilylation catalyst hereinbefore described but is preferably a platinum based catalyst.

Preferably the hydrosilylation catalyst is a platinum group metal based catalyst selected from a platinum, rhodium, iridium, palladium or ruthenium catalyst. Platinum group metal containing catalysts useful to catalyse curing of the present compositions can be any of those known to catalyse reactions of silicon bonded hydrogen atoms with silicon bonded alkenyl groups. The preferred platinum group metal for use as a catalyst to effect cure of the present compositions by hydrosilylation is a platinum based catalyst. Some preferred platinum based hydrosilylation catalysts for curing the present composition are platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes. Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4_3[(R^3)_2S]_3$, $(R^2_3P)_2Rh(CO)X^4$, $(R^2_3P)_2Rh(CO)H$, $Rh_2X^4_2Y^2_4$, $H_aRh_b olefin_c Cl_d$, $Rh(O(CO)R^3)_{3-n}(OH)_n$ where $X^4$ is hydrogen, chlorine, bromine or iodine, $Y^2$ is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z^4)(En)_2]_2$, or $(Ir(Z^4)(Dien)]_2$, where $Z^4$ is chlorine, bromine, iodine, or alkoxy, En is an olefin and Dien is cyclooctadiene may also be used.

The hydrosilylation catalyst may be added to the present composition in an amount equivalent to as little as 0.001 part by weight of elemental platinum group metal, per one million parts (ppm) of the composition. Preferably, the concentration of the hydrosilylation catalyst in the composition is that capable of providing the equivalent of at least 1 part per million of elemental platinum group metal. A catalyst concentration providing the equivalent of about 3-50 parts per million of elemental platinum group metal is generally the amount preferred.

The curing agent may alternatively be a condensation reaction catalyst because the present compositions may alternatively be cured and/or cross-linked by a condensation reaction in combination with a siloxane and/or silane cross-linker having at least two and preferably at least three groups reactable with hydroxyl or hydrolysable groups provided a majority of polymer molecules contain at least two condensable groups as hereinbefore described suitable for reaction with said cross-linker.

Optional additives for a high consistency rubber composition may comprise one or more of the following rheology modifiers, pigments, colouring agents, anti-adhesive agents adhesion promoters, heat stabilisers, blowing agents, flame retardants, electrically and/or thermally conductive fillers, and desiccants, each of which are preferably as hereinbefore described.

Other optional ingredients which may be incorporated in the composition of a high consistency silicone rubber include handling agents, peroxide cure co-agents, acid acceptors, and UV stabilisers.

Handling agents are used to modify the uncured properties of the silicone rubber such as green strength or processability sold under a variety of trade names such as SILASTIC®-1, HA-2 and HA-3 sold by Dow Corning corporation)

Peroxide cure co-agents are used to modify the properties, such as tensile strength, elongation, hardness, compression set, rebound, adhesion and dynamic flex, of the cured rubber. These may include di- or tri-functional acrylates such as Trimethylolpropane Triacrylate and Ethylene Glycol Dimethacrylate; Triallyl Isocyanurate, Triallyl Cyanurate, Polybutadiene oligomers and the like. Silyl-hydride functional siloxanes may also be used as co-agents to modify the peroxide catalysed cure of siloxane rubbers.

The acid acceptors may include Magnesium oxide, calcium carbonate, Zinc oxide and the like.

The ceramifying agents can also be called ash stabilisers and include silicates such as wollastonite.

The preparation of high viscosity rubbers in accordance with the present invention enables the producer to avoid the problems and to some extent cost in the production of organopolysiloxane gums which are currently prepared for this application.

The silicone rubber composition in accordance with this embodiment may be made by any suitable route, for example one preferred route is to first make a silicone rubber base by heating a mixture of fumed silica, a treating agent for the silica, and the diluted organopolysiloxane polymer of the present invention. The silicone rubber base is removed from the first mixer and transferred to a second mixer where generally about 150 parts by weight of a non-reinforcing or extending filler such as ground quartz is added per 100 parts by weight of the silicone rubber base. Other additives are typically fed to the second mixer such as curing agents, pigments and colouring agents, heat stabilizers, anti-adhesive agents, plasticizers, and adhesion promoters. In a second preferred route the diluted organopolysiloxane polymer of the present invention and any desired filler plus any desired treating agent are fed into a reactor and mixed, further additives as described above including cure agents are then fed into the same reactor and further mixed.

Other potential applications of the present invention include use of the diluted polymer in hot melt adhesives, pressure sensitive adhesives, in encapsulants for solar cells and any other applications requiring the use of organopolysiloxane gums.

The invention will now be described by way of Example. Unless otherwise stated all viscosities provided were measured at 25° C.

Acetoxy Sealant Formulation and Properties

Two acetoxy sealant formulations (samples 1 and 2) were prepared using a polymer prepared in accordance with the present invention and the physical properties were compared with those of a traditionally produced extended acetoxy sealant formulation having a viscosity of 80 000 (mPa·s) (comp. 2). Samples 1 and 2 were prepared through polymerization of cyclic organopolysiloxanes having the formula $((CH_3)_2SiO)_4$ with a phosphazene base catalyst in the presence of Isopar® P hydrocarbon fluid (sold by Exxonmobil Corporation) as extender which has a initial boiling point of 235° C. and final boiling point of 265° C. (ASTM D 86) and a viscosity of 3.0 mPa·s. (ASTM D 445). The hydroxy terminated polydimethylsiloxane was used as the end-blocker and the silyl phosphate was the selected neutralising agent. The polymer formulations are shown in Table 1.

TABLE 1

EXTENDED POLYMER FORMULATION

|  | Sample 1 | Sample 2 |
|---|---|---|
| Polymerisation temperature | 100° C. | 120° C. |
| $((CH_3)_2SiO)_4$ (wt %) | 39.197 | 29.8975 |
| hydroxy terminated polydimethylsiloxane 70 mPa·s at 25° C. (wt %) | 0.8 | 0.1 |
| Extender (wt %) | 60.0 | 70 |
| phosphazene base catalyst (wt %) | 0.0018 | 0.0014 |
| Silyl phosphate (wt %) | 0.0012 | 0.0011 |

Table 2 shows the residual monomer left in the composition after completion of the polymerisation reaction together with details of the molecular weight of the polymer obtained for both sample 1 and sample 2 (ASTM D5296-05). The residual monomer may be stripped out of the polymer if required as the boiling point thereof is significantly lower than that of the diluent. The boiling point of $((CH_3)_2SiO)_4$ is 175° C.

TABLE 2

|  | Sample 1 | Sample 2 |
|---|---|---|
| Number averaged molecular weight (Mn) | 195,335 | 255,394 |
| Weight averaged molecular weight (Mw) | 429,789 | 561,100 |

An organopolysiloxane sealant composition was prepared from the resulting extended polymers described in Table 2 above. Samples 1 and 2 in Table 3 were prepared from Sample 1 and 2 in Table 2 respectively. In this case an additional amount of extender was added to the extended polymer to further reduce the viscosity. The sealant formulations both for the sealant prepared according to the invention and the comparative example.

The details of the compositions were provided in Table 3

TABLE 3

|  | Sample 1 | Sample 2 | Comp 1 |
|---|---|---|---|
| Total Wt % Extended Polymer | 86.4 | 86.4 | — |
| hydroxy terminated organopolysiloxane 80 000 mPa·s at 25° C. (wt %) (blended with diluent after to polymerisation) | — | — | 56.4 |
| Diluent (blended with polymer subsequent to polymerisation) (wt %) | — | — | 30 |
| Triacetoxysilane (wt %) | 5 | 5 | 5 |
| Fumed Silica (surface area 150 m²/g (BET)) (wt %) | 8.585 | 8.585 | 8.585 |
| Dibutyltin acetate (wt %) | 0.015 | 0.015 | 0.015 |

Physical Properties of Sealant

Standard physical property tests were in accordance with example 1 above unless otherwise indicated and the results are provided in Table 4 below.

Adhesion test (7dRT) was carried out to show that a bead of sealant successfully bonded to a standard glass plate after being allowed to cure at 23° C. and 50% relative humidity for 7 days. Adhesion was assessed by subsequent to the curing period the beads were pulled at 90° and the failure was rated as follows:

0: adhesive failure—poor adhesion)
1: boundary or mixed mode (adhesive/cohesive) failure—acceptable adhesion.
2: cohesive failure—excellent adhesion Adhesion test (7H$_2$O) was carried out to show that a bead of sealant successfully bonded to a standard glass plate after being allowed to cure at 23° C. and 50% relative humidity for 7 days and then subsequently 7 days in water. The bead of sealant was pulled as in adhesion test (7dRT).

TABLE 4

PHYSICAL PROPERTIES OF SEALANT

|  | Test Method | Sample 1 | Sample 2 | Comp 1 |
|---|---|---|---|---|
| Specific Gravity | ASTM D1475-98 | 0.92 | 0.90 | 0.97 |
| Penetration (mm/10) | ASTM D217-97 | 152 | 180 | 300 |
| Tensile Strength (Mpa) | ASTM D412-98a | 4.34 | 4.98 | 2.08 |
| Elongation at Break (%) | ASTM D412-98a | >1000 | >1000 | 480 |
| Modulus 100% (Mpa) | ASTM D638-97 | 0.12 | 0.09 | 0.44 |
| Shore A Hardness | ASTM D2240-97 | 4 | 1 | 13 |
| Adhesion on glass (7H$_2$O) |  | 2 (PASS) | 2 (PASS) | 2 (PASS) |
| Adhesion on glass (7dRT) |  | 2 (PASS) | 2 (PASS) | 2 (PASS) |

It will be appreciated that the acetoxy sealant made in accordance with the present invention has a number of advantages over the prior art formulation, The resulting sealant shows an increase in elasticity as can be seen from the elongation at break of greater than 1000%. This sealant formulation enables the use of polymers which would have had substantially unworkable viscosities were it not for the presence of the diluent during the polymerisation process without any significant handling difficulties and the fact that the resulting uncured sealant composition has a significantly lower specific gravity enables the manufacturer to fill more sealant cartridges or other packages per kg of sealant produced.

The invention claimed is:

1. A method of making a diluted organopolysiloxane polymer comprising hydroxyl and/or hydrolysable groups, said method comprising the steps of:
   (i) preparing an organopolysiloxane polymer by polymerising cyclic organopolysiloxane monomer(s) in the presence of an organic diluent material, a suitable catalyst and an end-blocking agent; and
   (ii) where required, quenching the polymerisation process; wherein the diluent material is substantially retained within the resulting diluted organopolysiloxane and is selected from one or more of the group consisting of linear or branched mono unsaturated hydrocarbons; and mineral oil fractions comprising linear (n-paraffinic) mineral oils, branched (iso-paraffinic) mineral oils, cyclic (naphthenic) mineral oils, and mixtures thereof.

2. A method in accordance with claim 1 wherein the cyclic organopolysiloxane monomer(s) have the general formula (R$_2$SiO)$_m$, wherein R denotes hydrogen or an optionally substituted alkyl, alkenyl, aryl, alkaryl or aralkyl group having up to 8 carbon atoms, m denotes an integer with a value of from 3 to 12.

3. A method in accordance with claim 1 wherein the cyclic organopolysiloxane monomer(s) comprise one or more selected from the group of octamethyl cyclotetrasiloxane, hexaorganocyclotrisiloxane, decamethyl cyclopentasiloxane, cyclopenta (methylvinyl) siloxane, cyclotetra (phenylmethyl) siloxane, cyclopenta methylhydrosiloxane.

4. A method in accordance with claim 1 wherein the catalyst is selected from one or more of the group of alkali metal hydroxides, alkali metal alkoxides or complexes of alkali metal hydroxides and an alcohol, alkali metal silanolates, the catalyst derived by the reaction of a tetra-alkyl ammonium hydroxide and a siloxane tetramer, phosphonitrile halides and phosphazene bases.

5. A method in accordance with claim 1 wherein an end-blocker is utilised to introduce unsaturated, hydroxyl, hydrolysable or amino group functionality in the diluted polymer.

6. A method in accordance with claim 5 wherein the hydrolysable group is selected from —Si(OH)$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ and —R$^a{}_2$Si—R$^c$—SiR$^d{}_p$(OR$^b$)$_{3-p}$ where each R$^a$ independently represents a monovalent hydrocarbyl group, each R$^b$ and R$^d$ group is independently an alkyl or alkoxy group in which the alkyl groups have up to 6 carbon atoms; R$^c$ is a divalent hydrocarbon group which may be interrupted by one or more siloxane spacers having up to 6 silicon atoms; and p has the value 0, 1 or 2.

7. A diluted organopolysiloxane polymer obtained by the method in accordance with claim 1.

8. A method of making a moisture curable composition capable of cure to an elastomeric body comprising the steps of claim 1 and further comprising the steps of mixing the diluted organopolysiloxane polymer with a cross-linking agent which is reactive with the diluted organopolysiloxane polymer, a condensation catalyst and optionally filler.

9. A method of making a moisture curable composition capable of cure to an elastomeric body in accordance with claim 8 wherein the cross-linking agent is one or more silane or siloxane which contain acyloxy groups and/or ketoximino groups, and the catalyst is a tin catalyst.

10. A method of making a moisture curable composition capable of cure to an elastomeric body in accordance with claim 8 wherein the cross-linking agent is one or more silane or siloxane which contain alkoxy groups and alkenyloxy groups, and the catalyst is a titanate or zirconate or a chelated titanate or chelated zirconate.

11. A method of making a moisture curable composition capable of cure to an elastomeric body in accordance with claim 8 wherein the filler comprises one or more finely divided, reinforcing fillers selected from the group of fumed silica, precipitated silica, and calcium carbonate, and/or one/or one or more non-reinforcing fillers selected from the group of crushed quartz, diatomaceous earth, barium sulphate, iron oxide, titanium dioxide, carbon black, talc, and wollastonite.

12. A moisture curable composition capable of cure to an elastomeric body, the composition comprising:
   a. a diluted organopolysiloxane having not less than two silicon-bonded hydroxyl or hydrolysable groups obtained by the method in claim 1;
   b. a siloxane and/or silane cross-linker having at least two groups per molecule which are reactable with the hydroxyl or hydrolysable groups in the diluted organopolysiloxane;
   c. optionally one or more fillers; and
   d. a suitable cure catalyst.

13. A cured sealant comprising the cured composition in accordance with claim 12 having an extension at break of greater than 700%.

14. A moisture curable composition capable of cure to an elastomeric body, the composition obtained by compounding the diluted organopolysiloxane polymer made in accordance with the method of claim 1 with a suitable cross-linking agent which is reactive with the organopolysiloxane polymer, a suitable condensation catalyst and optionally filler to form a one or two part organopolysiloxane sealant composition.

15. A method of making a moisture curable composition capable of cure to an elastomeric body comprising the steps of:
   A. making a diluted organopolysiloxane polymer comprising hydroxyl and/or hydrolysable groups according to a method comprising the steps of:
      (i) preparing an organopolysiloxane polymer by polymerising cyclic organopolysiloxane monomer(s) in the presence of an organic diluent material, a suitable catalyst and an end-blocking agent; and
      (ii) where required, quenching the polymerisation process;
      wherein the diluent material is substantially retained within the resulting diluted organopolysiloxane;
   B. mixing the diluted organopolysiloxane polymer with a cross-linking agent which is reactive with the diluted organopolysiloxane polymer, a condensation catalyst and optionally filler, wherein the cross-linking agent is one or more silanes or siloxanes which contain alkoxy groups and alkenyloxy groups, and the condensation catalyst is a titanate or zirconate or a chelated titanate or chelated zirconate.

16. A method of making a diluted organopolysiloxane polymer comprising hydroxyl and/or hydrolysable groups, said method comprising the steps of:
   (i) preparing an organopolysiloxane polymer by polymerising cyclic organopolysiloxane monomer(s) in the presence of an organic diluent material, a suitable catalyst and an end-blocking agent; and
   (ii) where required quenching the polymerisation process;
   wherein the diluent material is substantially retained within the resulting diluted organopolysiloxane and is a linear or branched mono unsaturated alkene or mixture thereof, and wherein the linear or branched mono unsaturated alkene contains from 12 to 25 carbon atoms.

17. A method of making a diluted organopolysiloxane polymer comprising hydroxyl and/or hydrolysable groups, said method comprising the steps of:
   (i) preparing an organopolysiloxane polymer by polymerising cyclic organopolysiloxane monomer(s) in the presence of an organic diluent material, a suitable catalyst and an end-blocking agent; and
   (ii) where required quenching the polymerisation process;
   wherein the diluent material is substantially retained within the resulting diluted organopolysiloxane and is selected from one or more of the group of polyisobutylenes (PIB), phosphate esters polyalkylbenzenes, and linear and/or branched alkylbenzenes esters of aliphatic monocarboxylic acids.

18. A composition as set forth in claim 12 wherein said diluent material is further defined as a linear or branched mono unsaturated alkene or mixture thereof, and wherein said linear or branched monounsaturated alkene contains from 12 to 25 carbon atoms.

19. A composition as set forth in claim 14 wherein said diluent material is further defined as a linear or branched mono unsaturated alkene or mixture thereof, and wherein said linear or branched monounsaturated alkene contains from 12 to 25 carbon atoms.

\* \* \* \* \*